United States Patent
Newman et al.

(10) Patent No.: US 11,943,160 B2
(45) Date of Patent: Mar. 26, 2024

(54) RESOURCE-EFFICIENT DEMARCATIONS FOR DOWNLINK MESSAGES IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

(21) Appl. No.: 18/369,155

(22) Filed: Sep. 16, 2023

(65) Prior Publication Data

US 2024/0007251 A1 Jan. 4, 2024

Related U.S. Application Data

(63) Continuation of application No. 18/084,800, filed on Jul. 30, 2023, now Pat. No. 11,799,608, which is a
(Continued)

(51) Int. Cl.
*H04W 72/21* (2023.01)
*H04L 5/00* (2006.01)
*H04W 72/0446* (2023.01)
*H04W 72/0453* (2023.01)
*H04W 72/1273* (2023.01)
(Continued)

(52) U.S. Cl.
CPC .......... *H04L 5/0051* (2013.01); *H04L 5/0053* (2013.01); *H04W 72/0446* (2013.01); *H04W 72/0453* (2013.01); *H04W 72/1273* (2013.01); *H04W 72/23* (2023.01)

(58) Field of Classification Search
CPC ............... H04L 5/0051; H04L 5/0053; H04W 72/0406; H04W 72/0446; H04W 72/0453
See application file for complete search history.

(56) References Cited

U.S. PATENT DOCUMENTS 9,572,149 B1 2/2017 Zhou
11,132,213 B1 9/2021 Wagner
(Continued)

FOREIGN PATENT DOCUMENTS

WO 2008064576 6/2008
WO 2017117424 7/2017

*Primary Examiner* — Faruk Hamza
*Assistant Examiner* — Abusayeed M Haque

(57) ABSTRACT

To assist a user device of a 5G or 6G network in finding its downlink messages, the base station can attach a leading and trailing demarcation to the message. The user device can recognize the demarcations, extract the data between them, and thereby receive the message without computation-intensive searching. Advantageously, the user device can request that the base station not transmit DCI (downlink control information) messages to the user device, since the user device can readily find its messages according to the demarcations. In various embodiments, the demarcations can indicate the address or identity of the intended recipient, the length of the message, the type of the message, and other information to assist the user device. In addition, for even easier detection of the demarcations, the base station can insert a gap of no transmission before and/or after each demarcation. Such demarcations may enable low-cost reduced-capability user devices.

18 Claims, 7 Drawing Sheets

Related U.S. Application Data continuation of application No. 17/846,100, filed on Jun. 22, 2022, now Pat. No. 11,546,111, which is a continuation of application No. 17/580,927, filed on Jan. 21, 2022, now Pat. No. 11,387,960.

(60) Provisional application No. 63/285,627, filed on Dec. 3, 2021, provisional application No. 63/283,649, filed on Nov. 29, 2021, provisional application No. 63/272,352, filed on Oct. 27, 2021, provisional application No. 63/254,357, filed on Oct. 11, 2021, provisional application No. 63/234,911, filed on Aug. 19, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04W 72/23* (2023.01)
*H04W 72/231* (2023.01)

(56) References Cited

U.S. PATENT DOCUMENTS

| | | | |
|---|---|---|---|
| 11,673,227 B2* | 6/2023 | Kuczek | B21B 13/12 |
| | | | 428/167 |
| 2007/0248226 A1* | 10/2007 | Chong | H04N 21/2383 |
| | | | 375/E7.009 |
| 2010/0215338 A1* | 8/2010 | Rodriguez | H04N 9/8042 |
| | | | 386/343 |
| 2012/0188907 A1* | 7/2012 | Dayal | H04W 72/1215 |
| | | | 370/254 |
| 2013/0028243 A1* | 1/2013 | Wentink | H04L 1/0026 |
| | | | 370/338 |
| 2017/0075852 A1 | 3/2017 | Mishra | |
| 2018/0144494 A1 | 5/2018 | Mujibiya | |
| 2018/0352500 A1 | 12/2018 | Baldemair | |
| 2019/0104503 A1 | 4/2019 | Niu | |
| 2019/0349130 A1 | 5/2019 | Khoshnevisan | |
| 2019/0191434 A1 | 6/2019 | Hugl | |
| 2019/0342777 A1 | 11/2019 | Tiirola | |
| 2020/0205200 A1 | 6/2020 | Newman | |
| 2020/0229168 A1 | 7/2020 | Chen | |
| 2020/0235847 A1 | 7/2020 | Wang | |
| 2020/0260420 A1 | 8/2020 | Blankenship | |
| 2021/0112583 A1 | 4/2021 | Gao | |
| 2021/0120560 A1 | 4/2021 | Kutz | |
| 2021/0136771 A1 | 5/2021 | Xu | |
| 2021/0143953 A1 | 5/2021 | Parkvall | |
| 2021/0160828 A1 | 5/2021 | Taherzadeh | |
| 2021/0168781 A1 | 6/2021 | Lee | |
| 2021/0168782 A1 | 6/2021 | Hamidi-Sepehr | |
| 2021/0185651 A1 | 6/2021 | Seo | |
| 2021/0195579 A1 | 6/2021 | Lei | |
| 2021/0235247 A1 | 7/2021 | Lee | |
| 2021/0321317 A1* | 10/2021 | Fong | H04W 72/535 |
| 2021/0360523 A1 | 11/2021 | Hwang | |
| 2021/0365230 A1 | 11/2021 | Sul | |
| 2022/0189503 A1* | 6/2022 | Blaser | G06N 3/045 |

* cited by examiner

RESOURCE-EFFICIENT DEMARCATIONS FOR DOWNLINK MESSAGES IN 5G AND 6G

PRIORITY CLAIMS AND RELATED APPLICATIONS

This application is a continuation of U.S. patent application Ser. No. 18/084,800, entitled "Low-Complexity Method for Identifying Downlink Messages in 5G and 6G", filed Dec. 20, 2022, which is a continuation of U.S. patent application Ser. No. 17/846,100, entitled "Demarking the Start and End of 5G/6G Downlink Messages", filed Jun. 22, 2022, which is a continuation of U.S. patent application Ser. No. 17/580,927, entitled "Downlink Demarcations for Rapid, Reliable 5G/6G Messaging", filed Jan. 21, 2022, which claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/234,911, entitled "Short Demodulation Reference for Improved Reception in 5G", filed Aug. 19, 2021, and U.S. Provisional Patent Application Ser. No. 63/254,357, entitled "Low-Complexity Downlink, Uplink, and Sidelink Messaging in 5G", filed Oct. 11, 2021, and U.S. Provisional Patent Application Ser. No. 63/272,352, entitled "Sidelink V2V, V2X, and Low-Complexity IoT Communications in 5G and 6G", filed Oct. 27, 2021, and U.S. Provisional Patent Application Ser. No. 63/283,649, entitled "Downlink Demarcations for Rapid, Reliable 5G/6G Messaging", filed Nov. 29, 2021, and U.S. Provisional Patent Application Ser. No. 63/285,627, entitled "Custom Downlink Search-Spaces for Low-Complexity 5G/6G Messaging", filed Dec. 3, 2021, all of which are hereby incorporated by reference in their entireties.

FIELD OF THE INVENTION

Protocols are disclosed for low-complexity 5G and 6G communications, and particularly for low-complexity downlink messaging.

BACKGROUND OF THE INVENTION

In 5G and 6G, detecting a downlink control message is a complex process. The user device is required to perform an arduous and time-consuming blind search across many "candidate" message possibilities across a wide range of time, frequency, length, and configuration variables, and must test each one of those possible combinations to determine whether the candidate is a message addressed to the user node. Many, if not most, future wireless applications are expected to rely on single-purpose devices such as sensors and actuators, which are typically tightly cost-constrained. Such single-task devices typically have very low communication demands. Low-cost processors such as microcontrollers may struggle to keep up with these search demands. In addition, the wasted power may drain battery-powered systems sooner than necessary. What is needed is a low-complexity protocol for user devices to recognize messages intended for them.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device of a wireless network, the method comprising: transmitting, to a base station of the wireless network, a request message requesting that a leading demarcation and a trailing demarcation be concatenated with downlink messages to the user device, and that DCI (downlink control information) messages not be transmitted to the user device; receiving data on a downlink channel; detecting, according to the data, the leading demarcation and the trailing demarcation; determining that data received between the leading and trailing demarcations comprise a downlink message; and demodulating the downlink message.

In another aspect, there is a method for a base station of a wireless network, the method comprising: receiving, from a user device of the wireless network, a request message requesting that a leading demarcation and a trailing demarcation be concatenated with downlink messages to the user device, and that DCI (downlink control information) messages not be transmitted to the user device; and then, without transmitting a DCI message to the user device, transmitting a downlink message to the user device, the downlink message prepended by the leading demarcation and appended by the trailing demarcation.

In another aspect, there is a method for a user device of a wireless network, the method comprising: monitoring data on a downlink channel of the wireless network; detecting, based on the monitoring, a predetermined leading demarcation and a predetermined trailing demarcation; demodulating, or attempting to demodulate, data between the leading and trailing demarcations; and determining, according to the demodulating, that the data between the leading and trailing demarcations comprises a downlink message addressed to the user device.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
FIG. 1A is a schematic showing an exemplary embodiment of a low-complexity downlink message with demarcations, according to some embodiments.

Disclosed herein are systems and methods for rapid low-complexity downlink messaging with high reliability in 5G and 6G networks. Systems and methods disclosed herein (the "systems" and "methods", also occasionally termed "embodiments", "versions", or "arrangements", generally according to present principles) can provide urgently needed wireless communication protocols to reduce computational demands, energy consumption, message loss, retransmission delays, and uncertainty in downlink messaging in 5G and 6G networks, according to some embodiments. The protocols may also be applicable to uplink and sidelink and other types of messages. The protocols may include demarking each downlink message, and particularly each downlink control message, by prepending or appending a predetermined pattern to the message, thereby indicating the position and size of the message. Demarcation, according to some embodiments, may reduce the number of calculations and tests that the recipient must perform, thereby reducing the chance of message faults, simplifying receiver software, and saving substantial computational power, while avoiding unnecessary delays such as retransmission delays.

Terms herein generally follow 3GPP (third generation partnership project) standards, with additional terms defined as needed. A wireless network generally includes a base station (or gNB, generation Node B, eNB, evolved Node B, AP, access point, or the like) in signal communication with a plurality of user devices (or UE, user equipment, terminals, user nodes, or the like). 5G and 6G technologies are designed for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. "5G" represents fifth-generation wireless technology and "6G" sixth-generation wireless technology. "NB-IoT" (narrow-band Internet-of-things) and "5G-Light" are versions that provide slightly reduced complexity and bandwidth requirements. A network (or cell or LAN Local Area Network or RAN Radio Access Network or the like) may include a base station in signal communication with a plurality of user devices and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also "resource element groups" or "REG" or "channels" in references) including 12 subcarriers. The "numerology" of a resource grid corresponds to the subcarrier spacing in the frequency domain. Each subcarrier is at a slightly different frequency. Subcarrier spacings of 15, 30, 60, 120, and 240 kHz are defined in various numerologies. Each subcarrier can be independently modulated to convey message information. Thus a resource element, spanning a single symbol period in time and a single subcarrier or subchannel in frequency, is the smallest unit of a message. A message is "unicast" if it is addressed to a specific recipient, and "broadcast" if it includes no recipient address. Communication in 5G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user nodes, among other channels that may be in use. In addition, one or more random access channels, termed "RACH" herein, also called PRACH in references, represents both abstract and physical random access channels, including potentially multiple random access channels in a single cell, and configured for uplink and/or downlink, as detailed below. "CRC" (cyclic redundancy code) is an error-detection code. "RNTI" (radio network temporary identity) such as "C-RNTI" (cellular RNTI) are network-assigned user identification codes. "MAC" (media access control) is a global identification code. "DMRS" (demodulation reference signal) is a standard demodulation reference. A "DCI" (downlink control information) message is a message transmitted from a base station to a user device indicating a scheduled uplink grant or downlink transmission, among other tasks.

In addition, the following terms are defined herein. Each modulated resource element of a message is referred to as a "modulated message resource element", or more concisely as a "message element" in examples below, thereby avoiding confusion with ambiguous terms such as "symbol". Likewise, each resource element of a demodulation reference is a "reference element" herein. A "start" of a message refers to the first or starting resource element of the message, and the "end" of a message refers to the last or ending resource element of the message. A message may be configured "time-spanning" if it occupies multiple sequential symbol periods at a single frequency, or "frequency-spanning" if it occupies multiple subcarriers at a single symbol period (thereby avoiding terms "TDD" time-division duplexing and "FDD" frequency-division duplexing, which properly refer to duplexing). A message may be arranged "frequency-first" if the message elements proceed across multiple subcarriers until reaching a limit, such as a resource block boundary, and then proceeding to the next symbol period. A device "knows" something if it has the relevant information. A message is "faulted" or "corrupted" if one or more bits of the message are altered relative to the original message. "Receiver" is to be interpreted broadly, as including connected processors and other electronics and related software/firmware configured to receive and process incoming wireless messages. "Random" and "pseudorandom" may be used interchangeably. "Low-complexity" refers to devices and procedures necessary for wireless communication, exclusive of devices and procedures that provide high-performance communication. 5G/6G specifications include many procedures and requirements that greatly exceed those necessary for wireless communication, in order to provide high-performance communications at low latency and high reliability for users that demand it. Compared to high-performance 5G/6G communications, low-complexity procedures generally require less computation and less signal processing, while providing defaults that involve fewer computation steps and/or smaller memory spaces. "Reduced-capability" refers to wireless devices that cannot comply with 5G/6G protocols, absent the systems and methods disclosed herein. Many future IoT (internet of things) use cases are expected to involve simple, low-cost, reduced-capability MTC (machine-type communication) wireless devices. In addition, task-specific low-cost wireless applications typically have minimal wireless communication needs. Because both high-performance and reduced-capability devices share the same limited electromagnetic spectrum, it would be tragic if the simpler machine-type applications are forced to develop a separate wireless technology, competing with 5G and 6G for bandwidth and locations. A much more efficient solution is to include simpler protocols and defaults appropriate to the low-cost, low-demand MTC devices. For economic reasons as well as commercial feasibility, future IoT application developers will demand ways to transmit messages using protocols appropriate to the simpler devices.

The following examples illustrate low-complexity options including fixed-pattern "demarcations" appended and/or prepended to downlink messages.

FIG. 1A is a schematic showing an exemplary embodiment of a low-complexity downlink message with demarcations, according to some embodiments. As depicted in this non-limiting example, a low-complexity downlink control or data message may include a predetermined "demarcation" 101 which is one or more resource elements having a predetermined modulation, as opposed to data. Each demarcation 101 may be prepended to the message 102 and configured to indicate the start of the message 102, and/or an appended demarcation 103 configured to indicate the end of the message 102. The prepended and appended demarcations may be the same or different. The demarcations 101,103 may be modulated as plain-text, that is, without scrambling, encoding, bit interleaving, or other manipulations that may impede the receiver in recognizing the demarcations 101,103. The receiver may then monitor a downlink channel, such as a PDCCH or PDSCH channel, and may detect the prepended demarcation 101, and may thereby determine the start of the message 102. The receiver may continue monitoring the channel and detect the appended demarcation 103, and thereby determine the end of the message 102. The receiver may thereby avoid wasting time and energy on a "blind search" of candidate control messages in the downlink stream, according to some embodiments. The receiver can also recognize and receive a downlink data message demarked as shown, without requiring an unnecessary transmission first.

A user device may request that the transmitting entity (such as a base station) use either the prepended or appended demarcations, or both, for downlink control or data messages, or both. For example, during the initial access, or at a later time, the user device may transmit a message including an indication that the receiver is a reduced-capability device, or that the receiver is not capable of finding downlink messages reliably using the blind search methods, or explicitly requesting that the base station prepend and append the demarcations to downlink messages. The receiver may also explicitly or implicitly accept that, as a consequence of receiving the additional demarcations, the receiver may not achieve the lowest latency that high-performance user devices expect. For example, the demarcations necessarily occupy additional resource elements, therefore taking additional time or frequency resources to transmit in addition to the message itself, and therefore may be more difficult for the base station to schedule in busy traffic. For many applications, however, such compromises may be of little or no consequence. In addition, the extra resource elements may be partially offset by use of a regular 16-bit CRC, instead of the expanded 24-bit CRC that was introduced due to the large number of accidental agreements encountered in massive blind search operations to find downlink messages. In addition, the extra resource elements may be further compensated by avoiding a DCI transmission before each data message.

Although the message appears displayed horizontally in the figure, the message may be transmitted either frequency-spanning or time-spanning, or another configuration such as occupying multiple subcarriers and symbol times according to the resources allocated to the downlink message.

Although the example is described in terms of downlink from a base station, the message may be transmitted in sidelink (between user devices), with demarcations indicating where each sidelink message begins and ends. As a further option, the message may be transmitted uplink, from the user device to the base station, with demarcations indicating where the ends of the message occur.

Figure 1B:
FIG. 1B is a schematic showing an exemplary embodiment of a low-complexity message including a predetermined start-code, according to some embodiments.

FIG. 1B is a schematic showing an exemplary embodiment of a low-complexity downlink message including a predetermined start-code and a length indicator, according to some embodiments. As depicted in this non-limiting example, a downlink message 112 includes, or is transmitted contiguous with, a prepended demarcation which, in this case, is a start-code 111. The message 112 includes a leading length field 113 indicating the length of the message 112 to follow. As used herein, a "start-code" is a predetermined signal pattern that, when prepended to a message, indicates the start of the message. Likewise, an "end-code" is another predetermined signal pattern that, when appended to a message, indicates the end of the message. The start-code and end-code may be different. A user device, monitoring a downlink channel, may recognize the start-code 111, thereby determining the start of the message 112 including the length field 113, and may determine the end of the message 112 by adding the length 113 to the start position. In some embodiments, the length of the message may be provided explicitly in the length field, in resource elements for example. In other embodiments, the length field may include a code that indicates the length in ranges, such as the size code of a BSR (buffer status report) message for example.

Figure 1C:
FIG. 1C is a schematic showing an exemplary embodiment of a low-complexity message including a predetermined end-code, according to some embodiments.

FIG. 1C is a schematic showing an exemplary embodiment of a low-complexity downlink message including an appended end-code, according to some embodiments. As depicted in this non-limiting example, a message 122 has an appended end-code 123 indicating the end of the message.

Figure 1D:
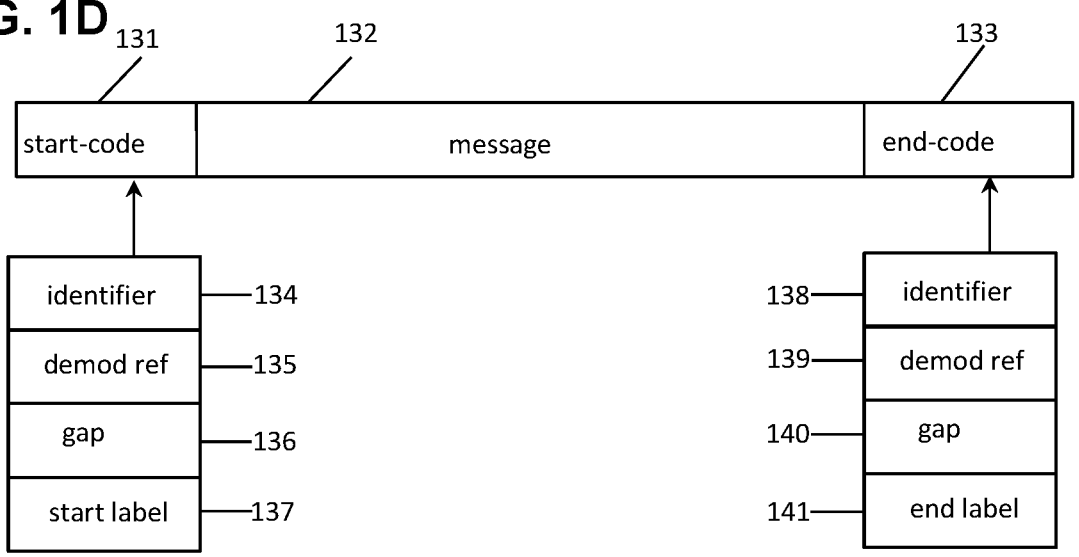
FIG. 1D is a schematic showing an exemplary embodiment of a low-complexity message including predetermined start-codes and end-codes, according to some embodiments.

FIG. 1D is a schematic showing an exemplary embodiment of a low-complexity downlink message including predetermined start-codes and end-codes, according to some embodiments. As depicted in this non-limiting example, a start-code 131 and an end-code 133 are provided to demark a message 132. The start-code 131 may include an identifier 134 such as one of the RNTI codes of the intended recipient. Alternatively, the start-code 131 may include a demodulation reference 135 such as a DMRS (demodulation reference signal) or a custom short-form demodulation reference as described below, for example. Alternatively, the start-code 131 may include a "gap" 136, which is a resource element having no signal therein. Alternatively, the start-code 131 may include a label 137 specifying a message starting point, among other possibilities for the start-code 131. Also shown, the end-code 131 may include a recipient identifier 138, a demodulation reference 139, a gap with no signal 140, or an endpoint label 141.

The receiver, monitoring and interpreting signals on a downlink channel, may detect messages intended for that receiver by detecting a start-code and interpreting the subsequent resource elements as the message content, or it may detect an end-code and interpret the foregoing resource elements as the message, or it may detect both a start-code and an end-code and thereby recognize that the intervening resource elements are the message. The receiver can then perform signal processing as necessary, such as descrambling and decoding, on the message elements, interpret an error-detection code (such as a CRC) therein, and determine whether the message is intended for that receiver when the error-detection code agrees with the bit-level content of the message. In other embodiments, the message may be transmitted in plain text, without scrambling for example, and the recipient may determine that the message is intended for it according to a start-code or end-code that includes the identification of the receiver, such as its C-RNTI code. In each case, the amount of computation required of the receiver in locating and interpreting the message may be less (usually very much less) than would be required, absent the demarcations. In addition, when applied to a downlink data message, the demarcations may enable the recipient to receive the message without a preceding DCI message, a further savings.

Figure 2:
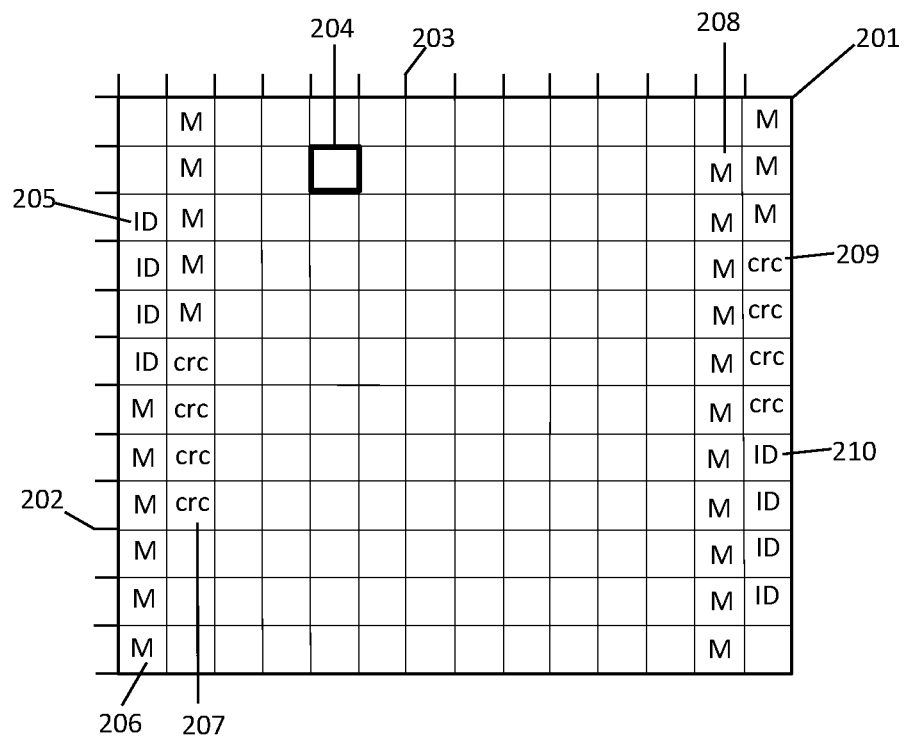
FIG. 2 is a schematic showing an exemplary embodiment of a resource grid including low-complexity downlink messages demarked with recipient address, according to some embodiments.

FIG. 2 is a schematic showing an exemplary embodiment of a resource grid including low-complexity downlink messages demarked with the recipient address, according to some embodiments. As depicted in this non-limiting example, a resource grid 201 includes subcarriers 202 indicated by horizontal lines, and symbol times 203 indicated by vertical lines. Each resource element, such as 204, is defined by one of the subcarriers 202 and one of the symbol times 203.

The resource grid 201 includes two frequency-spanning downlink messages that include demarcations including the identification code of the recipient of the message. A first message includes four elements marked "ID" 205 holding the RNTI of the recipient, for example, followed by a number of message elements 206 marked "M", and terminated by an error-detection code marked "CRC" 207. The identification code 205 thereby serves as a start-code indicating the start of the message 206, and also identifying plainly the identity of the intended recipient. The receiver may readily detect the identification code in plain-text (that is, not scrambled or punctured or encoded or transformed or otherwise obscured). The receiver may thereby determine that the message is intended for itself, without a blind search or a preceding DCI. This may greatly reduce the amount of computation required to determine the message's starting point, and may also ignore messages that are prepended by the identification codes of other users, thereby saving further computation.

A second message 208 includes a CRC field 209 and an appended end-code 210, which in this case is the identification code of the receiver. The receiver may record the various message elements 208, 209, 210 as-received as a series of measured modulation states or the corresponding bit sequences of each message element, and upon detecting the end-code 210 may recognize its own identification code. The receiver can thereby determine the content of the message 208. The receiver has thus obtained the message as intended.

Figure 3:
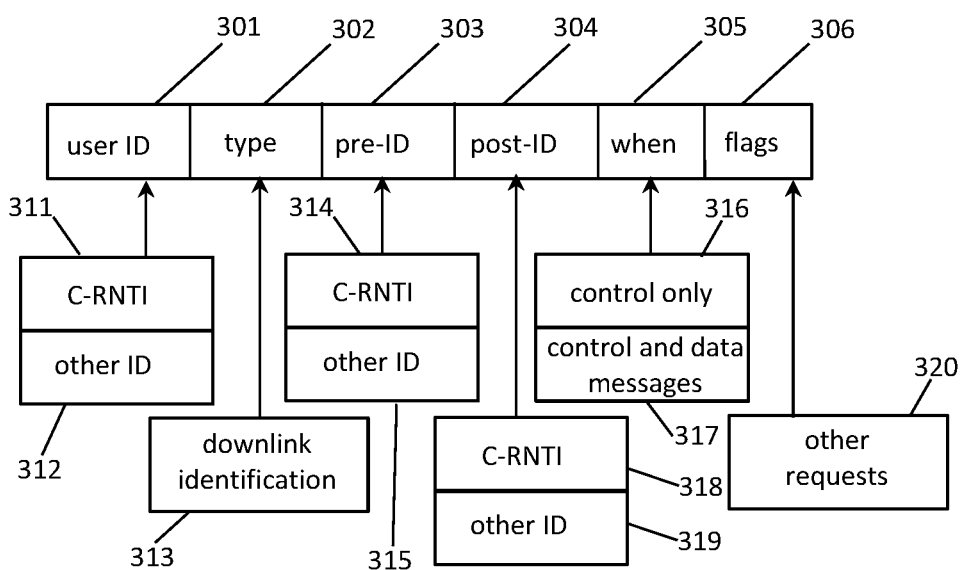
FIG. 3 is a schematic showing an exemplary embodiment of user request message specifying downlink identification demarcations, according to some embodiments.

FIG. 3 is a schematic showing an exemplary embodiment of user request message specifying downlink identification demarcations, according to some embodiments. As depicted in this non-limiting example, a user device may transmit a message to a base station requesting that certain demarcations be applied to each downlink message to that user. The request message may include an identification code 301 of the requesting user device, a "message type" field 302 indicating that the message is an accommodation request, a "pre-ID" field 303 indicating whether the base station should include a start-code exhibiting the receiver's identification code, a "post-ID" field 304 indicating the same for the end-code, a field 305 labeled "when" that instructs the base station whether to include the requested demarcations on control or data messages, and flags 306 which may provide additional options. All fields are optional.

More specifically, the user ID field 301 may include the C-RNTI identification code 311 of the receiver so that the base station knows which user device is lodging the request, or it may be another identification code 312 such as the full MAC address, or a compact self-selected code that minimizes resource usage, among other identification formats. The message type 302 may be configured to indicate that the request is to provide downlink demarcations 313 in the form of receiver identification codes. The pre-ID field 303 may be a flag indicating whether the base station should use the receiver's C-RNTI 314 or another code 315 as the start-code demarcations, and likewise the post-ID field 304 may indicate whether an end-code of the RNTI 318 or other 319 identification code is desired. The "when" field 305 may indicate whether the demarcation is expected on downlink control messages only 316 or on all downlink control and data messages 317. The flags 306 may indicate further requested details 320 as described in examples below. The base station, upon receiving the accommodation request message, may then record the details of the request including the type and position of the demarcations requested, and may then include the requested demarcations with subsequent downlink messages.

Figure 4:
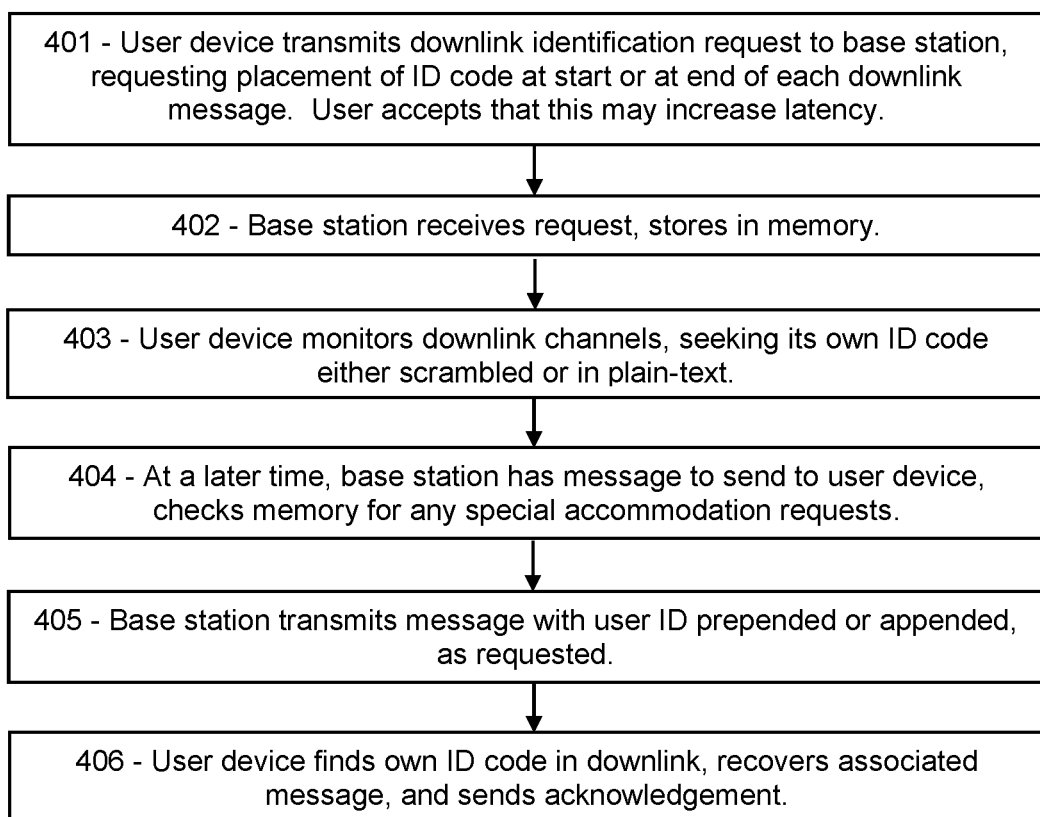
FIG. 4 is a flowchart showing an exemplary embodiment of a procedure for transmitting a downlink message including an identification demarcation, according to some embodiments.

FIG. 4 is a flowchart showing an exemplary embodiment of a procedure for transmitting a downlink message including an identification demarcation, according to some embodiments. As depicted in this non-limiting example, at 401 a user device transmits a request message, such as a downlink demarcation request including placement of the user device's identification code, to the base station. Understanding that such accommodation may cause additional delays, the user device may find that compromise acceptable. At 402, the base station receives the request and records, in its memory, the details of the request such as prepending or appending demarcations, and the type of demarcations, desired. At 403, the user device begins monitoring downlink channels such as the PDCCH and PDSCH for the user device's identification code. In some embodiments, the identification code may be scrambled according to the use device's identification code (that is, the identification code is itself used as the scrambling code), and the receiver can descramble it upon receipt. Alternatively, the identification code may be in plain-text, not scrambled. In either case, the receiver may determine the expected bit pattern of its identification code, with or without scrambling, and may scan for that bit pattern to recognize its message.

At 404, the base station has a message to send to the user device, so the base station checks its memory to see if the user device has requested any demarcations or other instructions. At 405, the base station transmits the message, with the receiver's identification code prepended as requested. At 406, the receiver detects its own identification code among the incoming resource elements, determines the message elements following that identification code, and transmits an acknowledgement back to the base station.

Thus, by detecting the identification code, the user has found the starting point of the message and determined that the message is intended for it, and can then readily determine the extent of the message according to an appended demarcation or by testing various lengths of the message against the error-detection code. The receiver has then received and interpreted the message with a small fraction of the computation that would be required for detection of messages without the demarcations.

FIGS. 5A-5F are schematics showing exemplary embodiments of downlink messages including start-codes and end-codes, according to some embodiments. As depicted in these non-limiting examples, a variety of start-code and end-code types may be provided to assist receivers in locating their downlink messages.

Figure 5A:
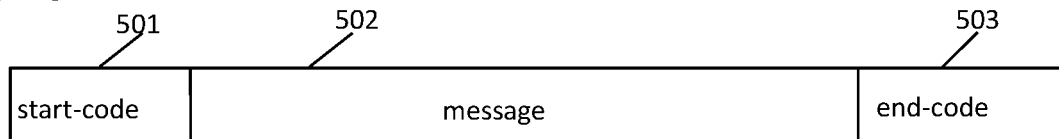
FIGS. 5A-5G are schematics showing exemplary embodiments of downlink messages including start-codes and end-codes, according to some embodiments.
Figure 5B:
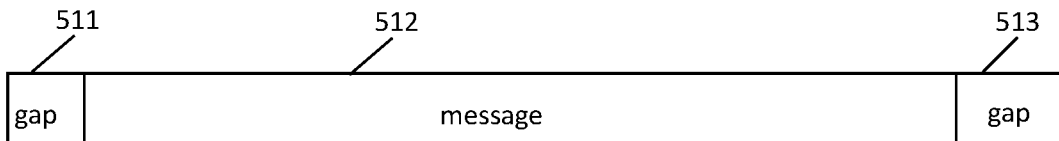

FIG. 5A shows a message 502 with a start-code 501 prepended and an end-code 503 appended. The start-code 501 and end-code 503 may be predetermined bit sequences that the user device can recognize. FIG. 5B shows a message 512 with a start-code configured as a gap 511. A gap is a resource element with no signal therein. Alternatively, the gap 511 may include signal with an amplitude below the lowest amplitude modulation level of the modulation scheme, or unmodulated carrier at the subcarrier frequency, or other signal not resembling a modulated resource element. Appended to the message 512 is another gap 513. Thus the gaps 511,513 demark the start and end of the message. A receiver can then scan a downlink channel for message regions demarked at both ends by gaps, and may thereby localize the message 512. Then, by checking an embedded RNTI or a scrambled CRC code, the receiver can determine whether the message belongs to that receiver, without a blind search and without a DCI.

Figure 5C:

FIG. 5C shows another version in which a message 522 is prepended by a demodulation reference "demod-1" 521 and appended by another demodulation reference "demod-2" 523. The demodulation references 521,523 may be conventional DMRS, or they may be a short-form demodulation reference of a custom type. For example, the short-form demodulation references may be configured to exhibit the maximum and minimum amplitude levels of the modulation scheme, and the maximum and minimum phase levels, so that the receiver can readily calculate any intermediate levels by interpolation. The receiver can then employ those demodulation references 521,523 in demodulating the message 522 with high fidelity, since the demodulation references 521,523 are in close proximity to the message 522. For example, the short-form demodulation reference may have just two reference elements, such as a first reference element modulated as the maximum amplitude and phase of the modulation scheme, and a second reference element modulated as the minimum amplitude and phase. Alternatively, one or both of the short-form demodulation references 521,523 may be in the reverse order, minimum amplitude and phase followed by the maximum amplitude and phase, or other combination exhibiting the maximum and minimum values. The demarcations configured as reference elements 521,523 may thereby indicate the start and end of the message 522, and may also provide demodulation levels in very close proximity to the message they are intended to demodulate.

The message 522 additionally includes a length field 524 indicating either the length of the remaining message portion 522, or the length of the message 522 including the length field 524, depending on convention. The receiver can then determine the location of the final demodulation reference 523 according to the length 524, further simplifying reception.

Figure 5D:
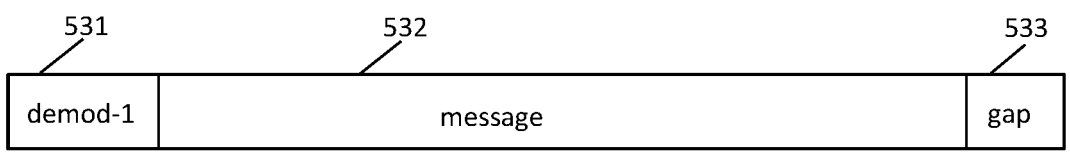

FIG. 5D shows an alternative embodiment of a message 532 preceded by a demodulation reference 531 and followed by a gap 533. The receiver may then recognize the start of the message 532 by the demodulation reference 531, and the end by the gap 533.

Figure 5E:
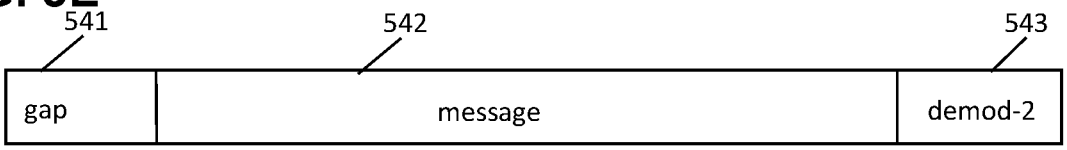

FIG. 5E shows yet another embodiment in which a message 542 is preceded by a gap 541 and followed by a demodulation reference 543. The receiver can find the start of the message 542 according to the gap 541, and the end of the message 542 by the demodulation reference 543.

Figure 5F:
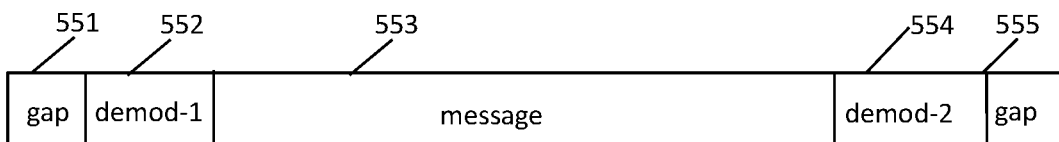

FIG. 5F shows an embodiment of a message 553 preceded by a start-code including a gap 551 and a demodulation reference 552, and followed by an end-code including another demodulation reference 554 and a final gap 555. The receiver can then recognize the extent of the message according to the gap positions 551,555 and can use the demodulation references 552,554 in demodulating the message 553.

Figure 5G:

FIG. 5G shows an embodiment of a message 564 having a start-code including a gap 561, a demodulation reference 562, and another gap 563. Appended is a gap 565, another demodulation reference 566, and a final gap 567. The user device can recognize the demodulation references 562, 566 according to the gaps around them, and the intervening message 564, without searching, other than to monitor the downlink channel for these characteristic patterns. Advantageously, a second message (not shown) may follow, and may share the first message's end-code 565, 566, 567 as the second message's start code. Any number of messages may be sequenced in this way, addressed to various users but demarked by the intervening gap-demod-gap combination.

Figure 6:
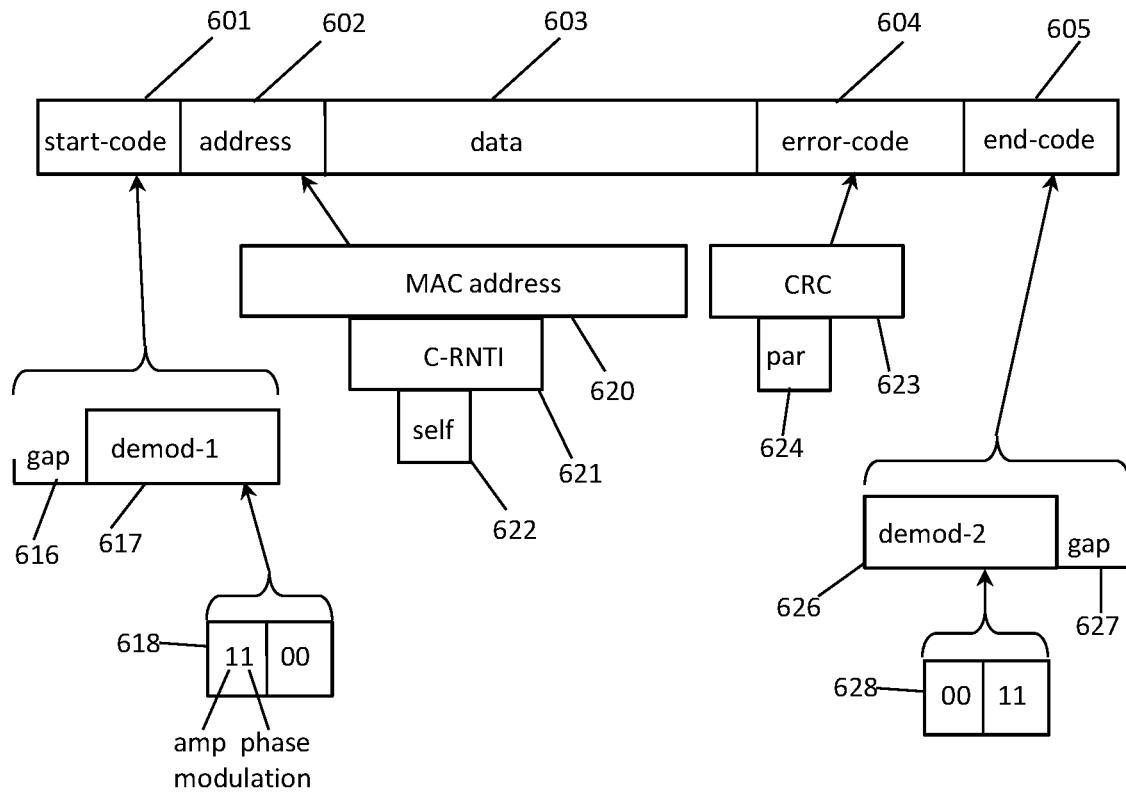
FIG. 6 is a schematic showing an exemplary embodiment of a downlink message including demarcations, address field, and error-detection field, according to some embodiments.

FIG. 6 is a schematic showing an exemplary embodiment of a downlink message including demarcations, address field, and error-detection field, according to some embodiments. As depicted in this non-limiting example, the message includes a prepended start-code 601, an address field 602, a data field 603, an error-detection code 604, and an end-code 605. All fields are optional.

The start-code 601 may be configured to indicate the start of the message according to a predetermined pattern of signals. For example, the start-code 601 may include a gap 616 and a demodulation reference 617 such as a short-form demodulation reference 618 that exhibits, in two reference elements, the maximum amplitude and phase levels of the modulation scheme, followed by the minimum amplitude and phase levels (or other suitable arrangement of the maximum and minimum amplitude and phase levels). The maximum levels may be symbolized as "11" in the first reference element, and the minimum by "00" in the second reference element. The representation indicates, in the first numeral, "1" for the maximum amplitude and "0" for the minimum amplitude. The second numeral represents phase, with again "1" being the maximum phase and "0" the minimum phase. In each case, the receiver can readily calculate any intervening amplitude and phase levels of the modulation scheme by interpolating between the maximum and minimum values exhibited by the short-form demodulation reference.

The address field 601 may indicate the identification of the intended recipient of the message, such as its MAC address 620, its C-RNTI 621, its self-selected code 622, or other identifying code.

The data field 603 is the main part of the message and contains whatever information the base station has to send to the user device.

The error-detection field 604 may be a CRC code 623, a parity construct 624, or other code configured to expose and possibly correct errors in the message. In some embodiments, the error-detection code 604 may be scrambled with the identification code of the intended recipient. In that case, the address field 602 may not be necessary.

The end-code 605 may be configured to indicate the end of the message, such as a demodulation reference 626 and/or a gap 627. The demodulation reference 626 may again be a short-form demodulation reference 628 exhibiting the maximum and minimum amplitude and phase levels of the modulation scheme. In the depicted case, the short-form demodulation reference 628 has an opposite code from the start-code demodulation reference 618. Specifically, the end-code demodulation reference 628 has the minimum amplitude and phase in the first reference element, and the maximum amplitude and phase in the second reference element. The same comments and features apply equally to a phase-modulated scheme such as QPSK.

The figure, and the other examples herein, refer to the modulation scheme in which a standard amplitude modulation is multiplexed with phase modulation, since this provides the best SNR (signal-to-noise ratio) under most conditions. However, in other embodiments, a different modulating scheme may be used, termed "pulse-amplitude modulation" or PAM, in which a first amplitude-modulated signal and a second amplitude-modulated signal are added with a 90-degree phase difference. The two signals are often called "real" and "imaginary" or "I" (in-phase) and "Q" (quad-phase), among other terms. For the purposes of the present disclosure, the two schemes are equivalent, as are other modulation schemes involving amplitude and/or phase modulation. It is immaterial whether the message elements are modulated according to amplitude and phase separately, or by PAM, or otherwise, so long as the receiver can calculate all of the modulation levels from those exhibited in the two modulated resource elements shown. For consistency and clarity, the examples show the standard amplitude and phase modulation version, but artisans with skill in the art will recognize how the principles disclosed herein can apply equivalently to PAM and the other modulation schemes.

Figure 7A:
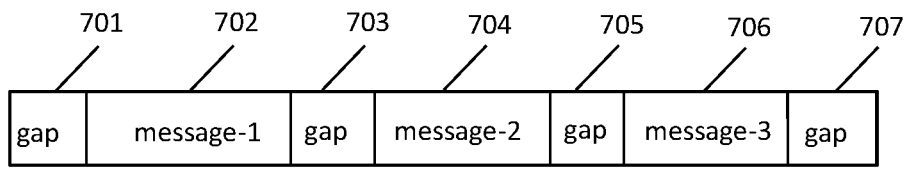
FIG. 7A is a schematic showing an exemplary embodiment of multiple messages demarked by gaps, according to some embodiments.

FIG. 7A is a schematic showing an exemplary embodiment of multiple messages demarked by gaps, according to some embodiments. As depicted in this non-limiting example, the messages are separated by a gap, configured to assist the receiver in determining where each message begins and ends. Specifically, the sequence shows an initial gap 701, a first message 702, another gap 703, a second message 704, a gap 705, a third message 706, and a final gap 707. This example shows that a single gap may be "shared" by a preceding message and a succeeding message, thereby enabling the receiver to separate each message from the others.

Figure 7B:
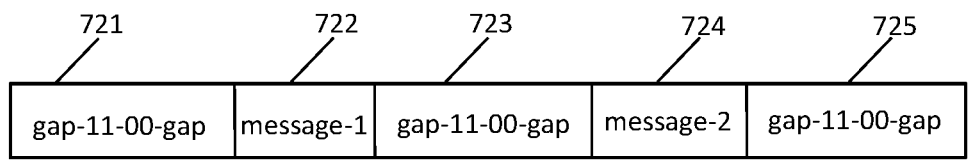
FIG. 7B is a schematic showing another exemplary embodiment of multiple messages demarked by gaps, according to some embodiments.

FIG. 7B is a schematic showing another exemplary embodiment of multiple messages demarked by gaps, according to some embodiments. As depicted in this non-limiting example, multiple messages are demarked at both ends by a separator, which is the same for the start and end of each message. In this case, an initial separator 721 is a gap, a short-format demodulation reference ("11-00" indicating the maximum amplitude and phase followed by the minimum amplitude and phase), and another gap. The first message 722 follows, and is separated from a second message 724 by another identical separator 723. A final separator 725 then follows. Since the ends of each message are unambiguously demarked by the characteristic separator pattern of gap-demod-gap, there is no need to indicate which one represents the start and end of the message. If a two-element short-format demodulation reference is used, as shown, then each separator occupies just four resource elements while providing a readily detected start and end of each message as well as a demodulation reference applicable to both of the adjacent messages.

Figure 8:
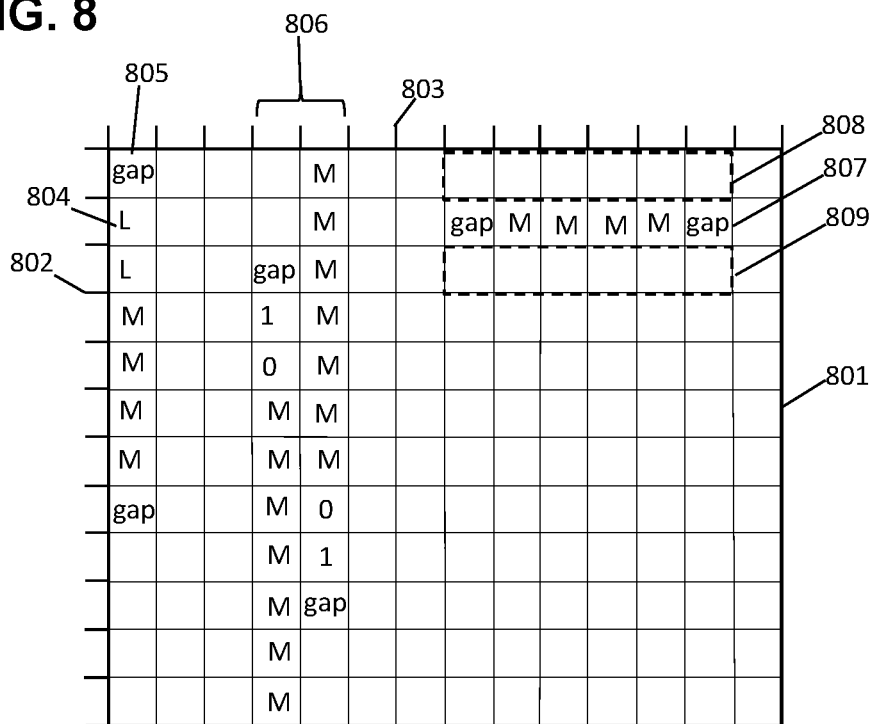
FIG. 8 is a schematic showing an exemplary embodiment of a resource grid including low-complexity downlink messages demarked by start-codes and end-codes, according to some embodiments.

FIG. 8 is a schematic showing an exemplary embodiment of a resource grid including low-complexity downlink messages demarked by start-codes and end-codes, according to some embodiments. As depicted in this non-limiting example, a resource grid 801 includes subcarriers 802 and symbol times 803 and three messages. A first message 805 is frequency-spanning, demarked by a gap at the start and end. The receiver can readily find the message 805 by monitoring the gaps in incoming data. The message includes a length field "L" 804 indicating the length of the message, to further assist the receiver in determining the ends of the message.

The second message 806 is also frequency-spanning, which rolls over into the next symbol time due to its length being larger than the allocated range of subcarriers. The second message 806 is preceded by a start-code consisting of a gap and a short-form demodulation reference showing the maximum phase level of the modulation scheme, followed by the minimum phase level, assuming QPSK modulation in this case. The second message 806 is then followed by an end-code including a short-form demodulation reference in which the minimum phase level is followed by the maximum phase level, and then a final gap. The receiver can locate the second message 806 according to the distinctive start-code and end-code.

A third message 807 is time-spanning, demarked by a gap at the start and end, and also isolated by blank subcarriers 808,809 on both sides of each message element, including the gaps. The blank subcarriers 808,809 may assist the receiver in determining the message elements by removing the closest potential interference signals. Reduced-capability receivers that may struggle to separate the subcarriers may benefit from the additional isolation thereby provided. In some embodiments, a time-spanning message that exceeds the size of a slot may continue, in the next slot on the same subcarrier, continuing at the next symbol time scheduled for downlink or unknown (that is, not scheduled for uplink or DMRS). In this way, by continuing across multiple slots or subframes, arbitrarily long time-spanning messages may be accommodated, a benefit to low-complexity receivers with minimal communication needs.

Figure 9:
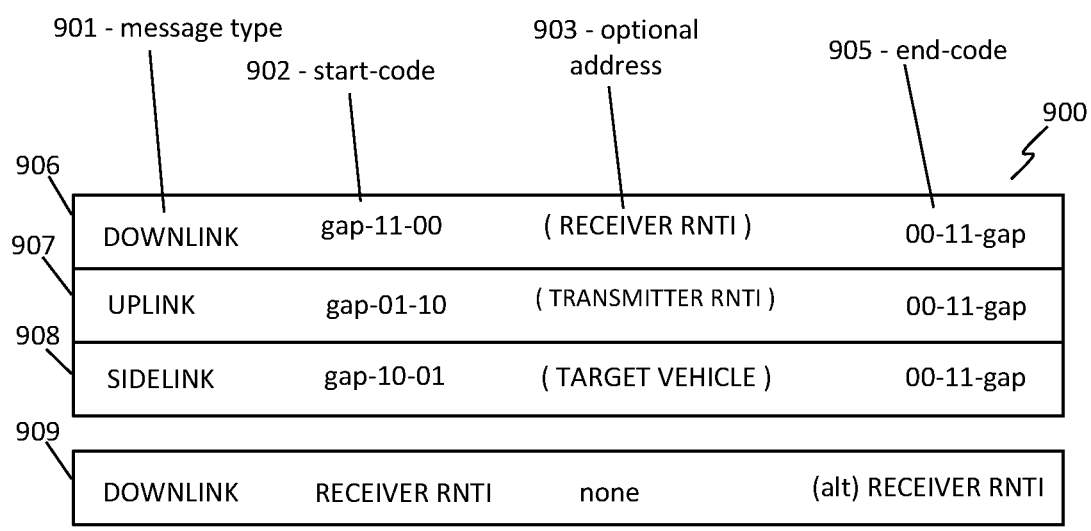
FIG. 9 is a schematic showing an exemplary embodiment of demarcation types according message types, according to some embodiments.

FIG. 9 is a schematic showing an exemplary embodiment of demarcation types according message types, according to some embodiments. As depicted in this non-limiting example 900, certain configurations of start-codes 902 and end-codes 905 may be adapted to the message type 901. Also shown is an optional address field 903.

For a downlink message 906, the start code may be a gap-11-00, that is, a resource element with little or no signal therein, followed by a short-form demodulation reference exhibiting the maximum amplitude and phase followed by the minimum amplitude and phase. If the downlink message includes an address, it is the RNTI or other identification of the recipient user device. For the end-code, a pattern distinct from the start-code may be used, such as the minimum amplitude and phase, then the maximum amplitude and phase, and finally a gap. In the depicted example, the same end-code is used for three of the message types 906,907,908.

For an uplink message 907, a start-code may be used with a pattern different from that of the downlink 906. For example, the uplink pattern may be a gap followed by an element with the minimum amplitude and maximum phase levels, followed by the maximum amplitude and minimum phase, as shown. If an address is included, it is the identification of the transmitting user device, thereby enabling the base station to determine which user device is transmitting the message. The end-code is again shown as the minimum amplitude and phase, then a demodulation reference with the maximum amplitude and phase, and a gap.

For a sidelink message 908, the start code may be yet another pattern, such as a gap, maximum amplitude with minimum phase, then minimum amplitude with maximum phase as shown. The end-code is the same as the others. If an address is provided, it is the intended recipient (target vehicle) of the sidelink message. In addition, the address of the transmitting vehicle may be included in the message itself.

An advantage of the message versions 906, 907, 908 may be that the codes function with modulation schemes that do not have amplitude modulation, such as QPSK. For example, with QPSK, the first numeral in each amplitude-phase code in the chart may be ignored. Then the start-code for the uplink and downlink becomes a gap followed by the maximum phase, followed by the minimum phase, while the end-code becomes the minimum phase, followed by the maximum phase, and then finally a gap. Thus the start-codes and end-codes are distinct with either modulation scheme, as desired. The codes for QPSK are the same for uplink 907 and downlink 906, but that should be no problem because the base station surely knows whether it is transmitting or receiving the message. For sidelink 908, the start-code and end-code have the same effective demodulation reference in QPSK, which is the minimum phase followed by maximum phase, but the position of the gap is opposite for the start-code and end-code in sidelink, and therefore the vehicles can determine message boundaries by that difference.

Also shown is a downlink message 909 with identification codes as the demarcation instead of gaps and demodulation references. The base station may include the identification code, such as one of the RNTI codes, prepended to the message, to assist the user device in finding and localizing its downlink messages. Alternatively, or in addition, the base station may include the identification code at the end of the message, and the receiver may thereby determine the end of the message and, working backwards, determine each of the message elements according to a scrambled error-detection code, for example.

Figure 10:
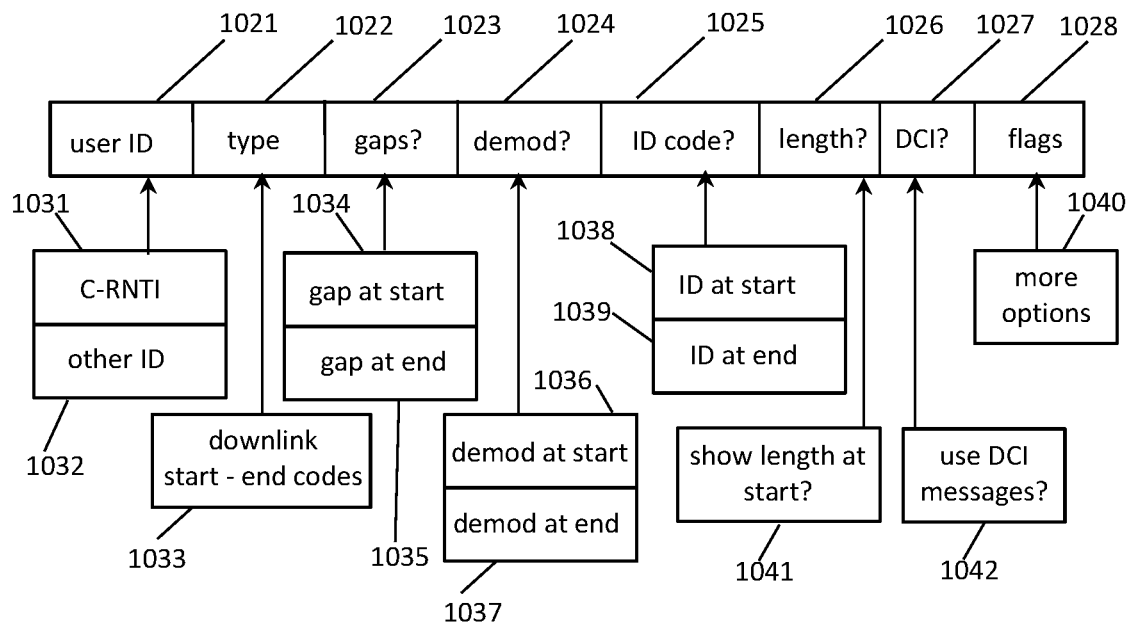
FIG. 10 is a schematic showing an exemplary embodiment of user request message specifying start-code and end-code demarcations, according to some embodiments.

FIG. 10 is a schematic showing an exemplary embodiment of user request message specifying start-code and end-code demarcations, according to some embodiments. As depicted in this non-limiting example, a user device can transmit a message to a base station requesting that downlink messages intended for that user device include prepended and/or appended demarcations of various types. The depicted message includes a user identification field 1021, a message type field 1022, a selection 1023 for placing a gap at the start and/or end of each downlink message, another selection 1024 for placing a demodulation reference at the start and/or end of each message, yet another selection 1025 for placing the identification code of the intended recipient in the start and/or end of each message, a selection 1026 for indicating the length of the message at the start, a DCI field 1027, and various flags 1028.

The user identification field 1021 may include the C-RNTI 1031 of the user device or its MAC address or a self-selected code or other identification code 1032. The message type field 1022 may be configured to indicate 1033 that the message is an accommodation request for downlink demarcations of the specified type, and implicitly accepts the reduced quality of service necessitated by the requested accommodations. The gaps selection 1023 indicates whether the user device requests a gap at the start 1034 of the message, or the end 1035, or both. In some embodiments, a selection field includes two bits, and therefore can encode one of four options, such as: no gaps, a gap only at start, a gap only at end, or gaps at both ends of the message.

The demodulation selection 1024 indicates whether the user device requests placement of a demodulation reference at the start 1036 or end 1037 of the message, or both. The ID code selection 1025 indicates whether the user device requests that its identification code be placed at the start 1038 or end 1039 of the message, or both. The length field 1026 indicates whether the receiver requests that the length of the message 1041 be included in the leading resource elements of the message. The DCI field 1027 indicates whether the user device requests that the base station transmit a DCI message 1042 before each data message. In some embodiments, when a user device has a small search space for both control and data messages, and has requested demarcations including identification, then the receiver can readily detect its downlink data messages without the need for a downlink control message. The scheduling message is then redundant Eliminating the unnecessary DCI message reduces latency and avoids generating radio background in busy traffic. (However, if the base station plans to transmit a downlink data message using an unexpected format or modulation or other parameter, different from the standard values expected by the user device, the base station may transmit a DCI message warning the user device of that fact even when the user device has declined DCI messages in the accommodation request.) The flags 1028 field indicates further options 1040 besides those listed, such as whether the gaps contain reduced signal or none at all, whether the demodulation references are short-form demodulation references, and what type of identification codes are to be used.

Figure 11:
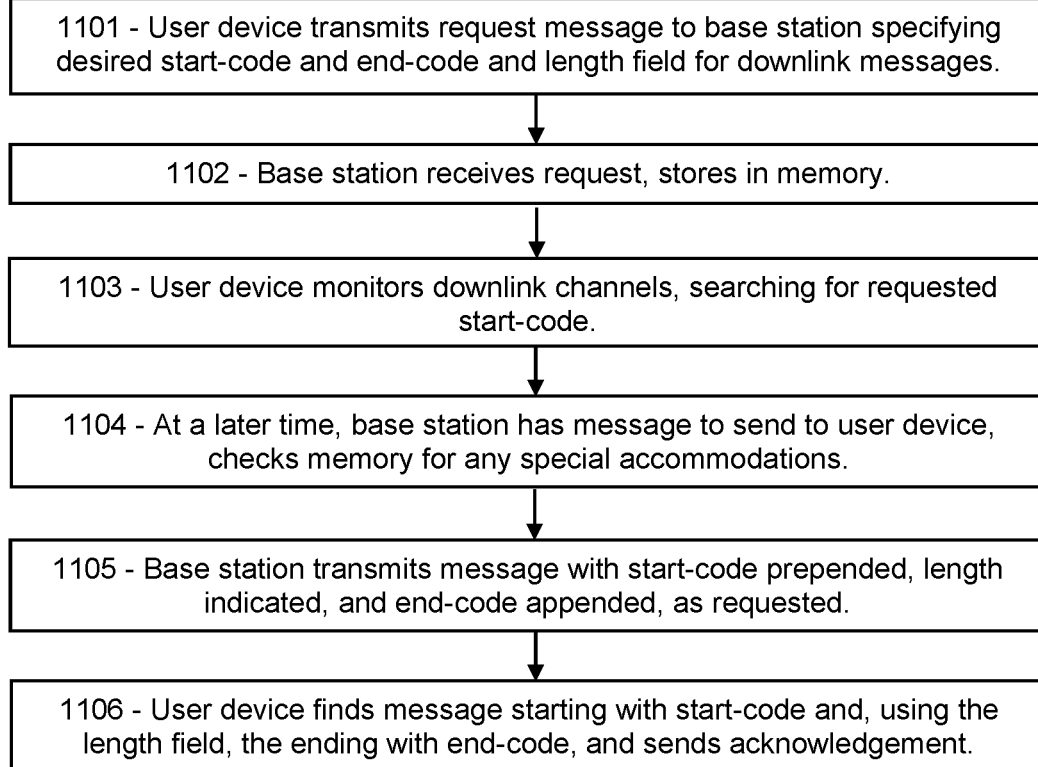
FIG. 11 is a flowchart showing an exemplary embodiment of a procedure for transmitting a downlink message including start-code and end-code demarcations, according to some embodiments.

FIG. 11 is a flowchart showing an exemplary embodiment of a procedure for transmitting a downlink message including start-code and end-code demarcations, according to some embodiments. As depicted in this non-limiting example, at 1101 a user device transmits a request message to a base station specifying which types of demarcations are desired for its downlink messages, such as the presence or absence of a gap, presence or absence of a demodulation reference, or presence or absence of an identification code at the start or end of each downlink message, and whether a DCI message is requested before each downlink data message, for example. At 1102, the base station receives the accommodation request message and stores the selections in its memory or equivalent media. At 1103, the user device monitors the downlink channels to detect any messages intended for that user device, according to the requested start-code or end-code or both.

At a later time, at 1104, the base station has a message to transmit to the user device, and checks the stored parameters to determine which demarcation types were requested. Then at 1105, the base station transmits the message, using the start-code prepended, the length field, and end-code appended, to the message as requested. At 1106, the user device detects the start-code, reads the length field, and locates the end-code. The user device demodulates and decodes and unscrambles the intervening message, verifies that the message is intended for that user device, and then sends an acknowledgement to the base station. Thus the user device, in cooperation with the base station, has detected and localized and extracted its message from the stream of downlink information, without performing a blind search and other time-consuming steps that would be required without the demarcations.

To summarize, a receiver can request that communication to it be configured in a low-complexity format that indicates the beginning and ending of each message by a particular start-code and end-code, and/or displays the intended recipient's address (optionally in plain-text), thereby allowing the receiver to process messages that are intended for it and to ignore all other messages, without performing complex and energy-consuming blind searches to find and identify each of its downlink messages. Further examples and formats, for both time-spanning and frequency spanning messages, in downlink, uplink, and sidelink communications, are also provided.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that may be seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or WiFi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s)

disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device of a wireless network, the method comprising:
   a) transmitting, to a base station of the wireless network, a request message requesting that a leading demarcation and a trailing demarcation be concatenated with downlink messages to the user device, and that DCI (downlink control information) messages not be transmitted to the user device;
   b) receiving data on a downlink channel;
   c) detecting, according to the data, the leading demarcation and the trailing demarcation;
   d) determining that data received between the leading and trailing demarcations comprise a downlink message; and
   e) demodulating the downlink message;
   f) wherein the leading demarcation comprises a demodulation reference and the trailing demarcation comprises a demodulation reference.

2. The method of claim 1, wherein the request message is transmitted according to 5G or 6G technology.

3. The method of claim 1, wherein the downlink channel is a PDCCH (physical downlink control channel) and the downlink message is a control message.

4. The method of claim 1, wherein the downlink channel is a PDSCH (physical downlink shared channel) and the downlink message is a data message.

5. The method of claim 1, wherein the leading demarcation is different from the trailing demarcation.

6. The method of claim 1, wherein the leading demarcation comprises an identification code of the user device.

7. The method of claim 1, wherein the leading demarcation comprises a first portion and the trailing demarcation comprises a second portion, wherein the first and second portions together comprise an identification code of the user device.

8. The method of claim 1, wherein the leading demarcation indicates a length of the downlink message.

9. A method for a base station of a wireless network, the method comprising:
   a) receiving, from a user device of the wireless network, a request message requesting that a leading demarcation and a trailing demarcation be concatenated with downlink messages to the user device, and that DCI (downlink control information) messages not be transmitted to the user device; and
   b) then, without transmitting a DCI message to the user device, transmitting a downlink message to the user device, the downlink message prepended by the leading demarcation and appended by the trailing demarcation;
   c) wherein each demarcation, of the leading and trailing demarcations, comprises a first gap with no transmission, followed by a demodulation reference, followed by a second gap with no transmission.

10. The method of claim 9, wherein the leading demarcation comprises a first gap with no transmission and the trailing demarcation comprises a second gap with no transmission.

11. The method of claim 10, wherein the first gap with no transmission is at a start of the leading demarcation and the second gap with no transmission is at an end of the second demarcation.

12. The method of claim 10, wherein the first gap with no transmission is at an end of the leading demarcation, adjacent to a start of the downlink message, and the second gap with no transmission is at a start of the second demarcation, adjacent to an end of the downlink message.

13. A method for a user device of a wireless network, the method comprising:
   a) monitoring data on a downlink channel of the wireless network;
   b) detecting, based on the monitoring, a predetermined leading demarcation and a predetermined trailing demarcation;
   c) demodulating, or attempting to demodulate, data between the leading and trailing demarcations; and
   d) determining, according to the demodulating, that the data between the leading and trailing demarcations comprises a downlink message addressed to the user device;
   e) wherein the leading demarcation or the trailing demarcation, or both, indicates a message type, of the downlink message.

14. The method of claim 13, wherein the downlink message is not preceded by a DCI (downlink control information) message.

15. The method of claim 13, wherein the leading demarcation or the trailing demarcation, or both, indicate an identification code of the user device.

16. The method of claim 13, wherein the leading demarcation or the trailing demarcation, or both, indicates a message type, of the downlink message.

17. The method of claim 13, wherein the leading demarcation or the trailing demarcation, or both, are scrambled with an identification code of the user device.

18. The method of claim 13, wherein:
   a) the downlink message is modulated in a modulation scheme comprising integer N level modulation levels comprising a maximum modulation level and a minimum modulation level; and
   b) the leading demarcation or the trailing demarcation, or both, comprise the maximum modulation level and the minimum modulation level;
   c) wherein the modulation scheme comprises amplitude modulation or phase modulation, and the N level modulation levels comprise amplitude levels or phase levels.

* * * * *